Sept. 8, 1959 H. A. QUIST 2,902,859
TEMPERATURE CORRECTED FLOAT GAUGE
Filed March 14, 1956 2 Sheets-Sheet 1

INVENTOR.
HAROLD A. QUIST
ATTORNEY

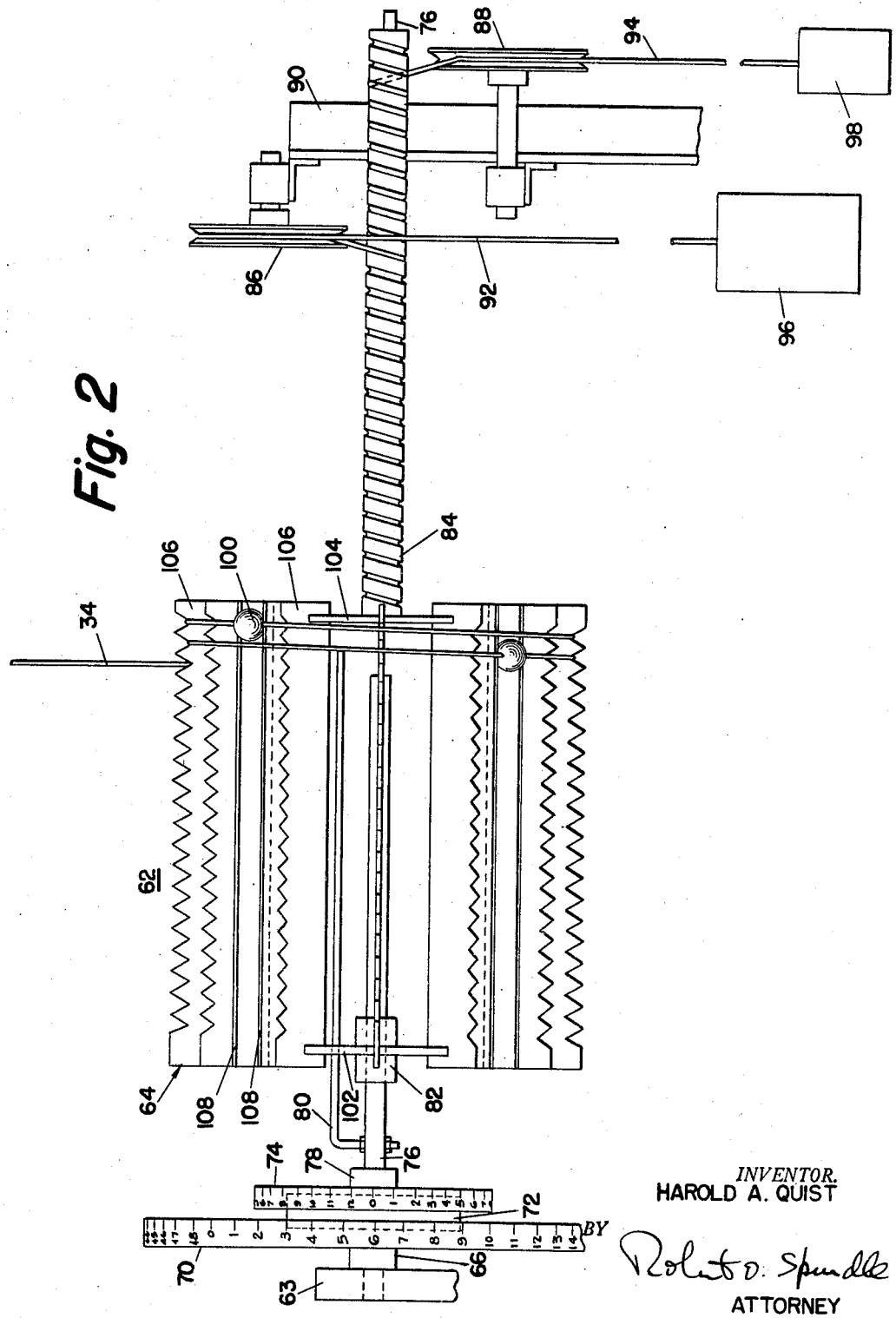

United States Patent Office 2,902,859
Patented Sept. 8, 1959

2,902,859

TEMPERATURE CORRECTED FLOAT GAUGE

Harold A. Quist, Swarthmore, Pa., assignor to Sun Oil Company, Philadelphia, Pa., a corporation of New Jersey Application March 14, 1956, Serial No. 571,454

6 Claims. (Cl. 73—321)

This invention relates generally to liquid level measuring devices and particularly to that class of such devices wherein a float as the liquid surface element is cable-connected to an indicating device.

Basically such a device is both simple and well known in the field of measuring volumes of stored liquid. Early devices reflecting this method of measurement were not, however, widely accepted due to operating difficulties and inaccurate results. It is therefore the primary object of this invention to disclose improvements in float-operated liquid level measuring devices which substantially increase their accuracy.

In the known forms of such mechanisms, there are three areas in which the operation of the combination may be faulty, resulting in inaccurate indication of liquid height. The first of these areas is within the tank or storage container. Misalignment of the liquid sensing element or float uses more than the correct length of connecting cable giving an erroneous reading. Secondly, a connecting cable extending through the roof of the tank and downwardly to the indicator is exposed to the effects of temperature altering the indicator operation. And finally the indicator must be adapted for operative engagement with the cable by means which is not subject to slippage or overlapping. These errors all affect the position of the indicator, making the basic device erroneous.

It is, therefore, a further object of this invention to disclose an improved float and cable combination which will convey correct liquid-level-sensing information to a responsive indicator.

Still another object is to disclose a non-binding, non-tangling cable means connecting float and indicator which is adapted to engage the responsive reeling element of the indicator in non-slipping operation.

Another object is to disclose reeling means for the indicator which will wind the cable in orderly fashion, free of frictional restraint and positionally adjustable, in the winding and unwinding operation, for perfect alignment.

A further object is to disclose a simple and effective indicating means responsive to the float effect as transmitted by the reeling mechanism reflecting liquid depth changes to a high degree of accuracy on an easily read indicator.

And another object is to disclose means for maintaining accuracy of the indicated liquid depths by correcting the effects of temperatures on both the connecting cable and the storage tank.

Other objects of the invention will become apparent from a reading of the specification taken in conjunction with the disclosure of the accompanying drawing in which:

Figure 2 is an elevational view of the indicator and accompanying elements forming a part of the gauging device.

As indicated above, the combination of elements, and their arrangement in this disclosure, is directed to overcoming objectionable weaknesses in float-operated liquid-level indicators. The float, sensitive to the changes in liquid level, is kept in alignment by using the arrangement shown in my Patent No. 2,730,123, issued January 10, 1956. By passing the cable connecting means through a seal, the external temperature effect on the exposed cable length is restricted to only the vertical run of the cable up the side of the tank from the indicator. And by controlling the indicator position with respect to temperature affecting the cable means and the tank, this error is corrected in its inception. Finally, by causing the cable and indicating means to move together in alignment, without lost motion and by greatly reducing the friction losses, the variations in liquid level are obtainable with great accuracy. These improvements will be better understood after reading the following description.

Figure 1:
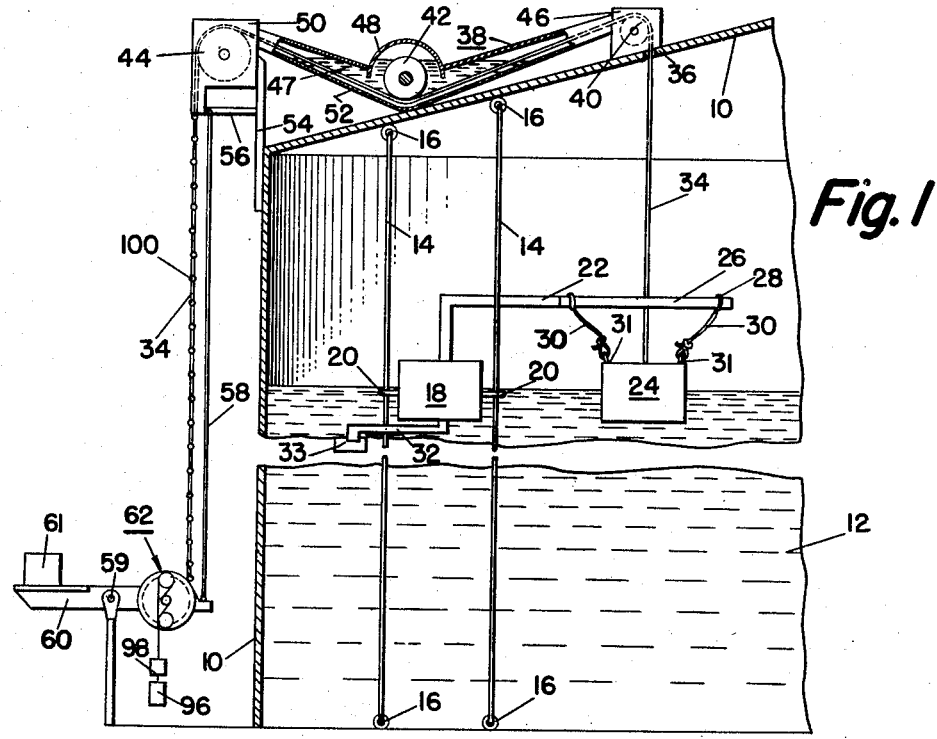
Figure 1 is an elevational view, partly broken away, of the device cooperating with a storage tank.

Figure 1 shows the float-actuated indicating device in operating position relative to a typical storage tank 10 supporting a body of liquid 12. Within the tank 10, shown as a covered or roofed type, the float arrangement of my Patent No. 2,730,123 is shown. A pair of guide cables 14 is anchored at the top and bottom of the tank in a manner illustrated at 16. The guide float 18 engages guides 14 as by wide loops 20 fastened to the float body, or any other comparatively free sliding means.

A bracket 22 extends upwardly and to one side of the guide float 18 in such manner as to clear the second or indicating float 24 shown beside float 18, the bracket being shaped, sized and so extended as not to obstruct or interfere with the free float operation of indicating float 24. It is convenient to shape the portion of the bracket to which float 24 is attached as a ring, here noted as number 26, and fully described in the patent of reference. By using the ring-shaped portion 26, float 24 my be flexibly controlled by attaching, with short flexible cables 30, attached to the bracket at points 28 and to the float at connectors 31.

To preserve a balance for the guide float 18 and reduce any tendency of that float to bind on guides 14 to a minimum, a counter balance bracket 32 and weight 33 are arranged to cooperate with the guide elements. The buoyant effect of the liquid 12 in which the counterbalancing means is immersed is taken into consideration when determining the operating influence of bracket 22.

Flexible means, such as cable 34, is firmly connected to indicating float 24 by any acceptable means, and extends upwardly through the ring portion 26 and through an aperture 36 in the roof of the tank into a sealing arrangement 38. As shown in Figure 1 of the drawing, this sealing arrangement is in the form of a liquid trap and approximates both the structure and purpose of a like trap shown in Patent No. 1,879,805 issued September 27, 1932 to H. A. Jones.

This sealing arrangement or liquid trap generally denoted by the numeral 38 is elongated to extend from the aperture 36 of cable 34 exit from the tank 10 to the side of the tank in vertical alignment with the indicator mechanism to be described later. Three sheaves or pulleys 40, 42 and 44 are separately supported in enclosed boxes 46, 48 and 50. A common passageway 52 connects all three supporting boxes providing a cableway for the flexible connector 34. The central pulley 42 is positioned below the level of the end pulleys 40 and 44, and as the cable 34 passes under center pulley 42 forms a definite elevational difference. Liquid 47, such as glycol or a mixture of glycol and water which is non-freezing, nonexplosive and non-volatile, fills the low portion of the cableway in box 48, forming the seal. Neither the vapors in the top of the tank 10 can escape, nor can air pass into the tank. Further, the temperature of the run of cable 34 across the top of the tank tends to remain substantially uniform because of the cableway 52 enclosing it.

Box 50, at the end of the cableway, supports pulley 44 which directs the cable 34 downwardly along the wall of tank 10 toward the indicator mounted at easy reading height from the ground in line with this direction of the cable. Projecting from bracket 54 which supports box 50 and enclosed pulley 44 together with the other end of cableway 52 is a bracket 56 elevationally aligned with the opening in box 50 from which cable 34 runs. Attached to bracket 56 and extending downwardly along the wall of the tank 10 parallel to cable 34, cable 58 extends to connect with pivotally supported frame 60 which mounts the indicator means 62. Pivot 59 supports frame 60 balancing indicator means 62 by weight 61. The point of connection of cable 58 with frame 60 is at the same level as the point of tangential contact between cable 34 and indicator reel 64, making the exposed parallel, vertical runs of operating cable 34 and thermal correction cable 58 equal.

All three figures of the drawing will be used in describing the indicator means 62, perhaps stressing the more detailed structure shown in Figure 2 because of clarity of detail. The pivotally supported frame 60 in turn supports the fixed end of the indicator means 62 as by a bearing 63, as shown on the left of Figure 2. A stub shaft 66, supported by bearing 63 which is mounted on frame 60, supports the indicator means 62 starting with adjacent indicator wheel 70 circumferentially divided to indicate foot graduations. A gear reduction or reductor 72, symbolically shown as they are readily available on the open market, connects indicator wheel 70 to a smaller wheel 74 divided into inch and fraction of an inch graduations. The relationship of revolution between these wheels 70 and 74 is controlled by the gear reduction means 72 and may be selected to serve the specific purpose. The satisfactory arrangement reached in solving one such problem will be described, later, as an example of operation of the device.

Continuing with the description of the shafting arrangement of the indicator mechanism 62, the next section of the shaft is numbered 76 and is firmly fastened to the hub 78 of the small indicator wheel 74 and mounts an engaging rod 80 drilled into shaft 76 and bent to engage the reel 64 as that element moves longitudinally in aligned rotation with the cable means 34. Reel 64, supported on the end adjacent the indicating wheels 70 and 74 by sleeve 82, is supported on the opposite end by helically grooved sleeve 84 which, in turn, is slidably supported by the prolongation of shaft 76. As will be noted by reference to the drawing this end of the indicator device does not rest on any bearing but is suspended, thereby reducing the normal friction of such supporting elements.

The suspension and operating means used in conjunction with the float supported by the tank-stored liquid will be evident on examination of all three figures in the drawing. The relative position of the elements is indicated in Figure 1, while longitudinal and end views are evident in Figures 2 and 3 respectively. A pair of sheaves or pulleys 86 and 88 are positioned to both support and align this sub-combination of the device on the bearing-free end of the indicator mechanism. Support 90 positions pulley 86 above helical drive-sleeve 84, while pulley 88 is below the same. Both are grooved and aligned to cause their respective weight-operated cables 92 and 94 to both rotate reel 64 and laterally align it in winding position for cable 34. Weights 96 and 98, attached to these cables 92 and 94 respectively, are the motive power for this operation, acting in cooperation, of course, with float 24.

These weights, it will be evident, are not equal, but are apportioned because of their respective duties, as will be described later in discussing the operation of the device.

Referring again to all the figures in the drawing, it is evident that the portion of the flexible connecting means shown here as cable 34 which will wind on reel 64 carries spaced-apart engaging members 100 shown as spheres or beads but can evidently be other shapes if desired. These engaging members are fixed to cable 34 at selected, regular spacing to conform with the size and construction of the reel 64. Further this selected spacing is preferably such that they will cover only that length of the connecting means which extends from the cableway into engagement with the reel, and does not pass into or out of the tank 10 during extremes of operation.

Figure 3:
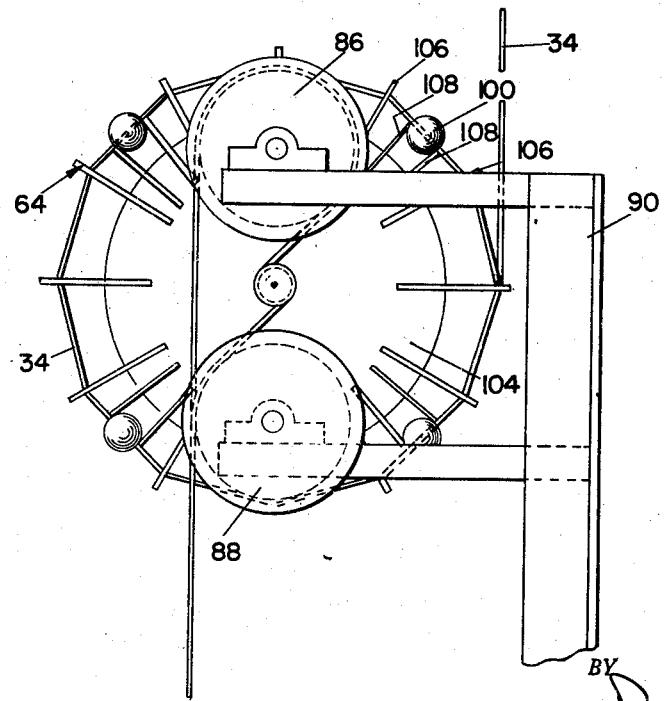
Figure 3 is an end view, enlarged, of the end of the reel mechanism shown in Figure 1 as part of the complete assembly.

As shown in Figures 2 and 3, the reel 64 is adapted to receive and hold these engaging members in non-slipping, non-interfering relationship, as it winds and unwinds. End supports 102 and 104 engaging respective sleeve members 82 and 84 are held by circumferentially spaced engaging means 106 which are notched and spaced relative to the end supports to provide a helical trace about the reel (Fig. 2). Between pairs of the notched engaging means 106, also radially extending from the reel but of lesser radius than the notched means, unnotched members 108 are positioned to receive engaging members 100. By spacing engaging members 100 on the flexible cable, and selecting the proper circumference for the reel, the members 100 can be caused to rest between selected unnotched engaging members and staggered circumferentially and longitudinally on the reel relative to each other, thereby avoiding any tendency to overlap or interfere in the winding operation.

It will be evident from the above description and study of the drawing that the combination of improved elements brings accuracy to float-operated liquid level indicators which was previously unknown. The indicating float 24 maintained in operating alignment initially insures accuracy over the full extent of movement as it follows the liquid level. By leading the flexible connecting means 34, shown as a cable here with fixed engaging members on the indicator engaging end, through a liquid-sealed conduit arrangement 38 the effect of temperature extremes over this portion of the cable becomes negligible. It then remains to correct the effects of temperature variations on the vertical, exposed portions of cable means 34 and the tank wall, and to transmit the corrected cable movement to an improved indicator.

The first of these measures, namely the correction of the effects of temperature variation for both the vertical portion of cable means 34 and the wall of tank 10 which affects the accuracy of indicator 62, is accomplished by use of cable 58 connected as shown. This cable 58 is preferably of the same material as cable means 34, although it will be evident that mechanical adjustment can be made where other material is used. Where both cables are of the same material, or material having equal expansion-contraction characteristics under variable thermal conditions, the structure remains simplified. Temperature correction cable 58 is connected at the top of the tank and has an exposed length equal and parallel to the like exposed length of operating cable means 34. Thus like expansion and contraction raises and lowers the pivoted indicator frame maintaining the effective length of the operating cable means accurate for all temperature changes.

At this operating cable means 34 extends over a pulley 44 mounted on the tank, any expansion or contraction of the tank must also be countered. To those versed in the art, it is well known that storage tanks are greatly effected by both internal and external temperature effects. Because of these different unpredictable effects, the proper correction to be made to readings of indicators of the type shown here has been incalculable. However, the structure shown in this disclosure automatically corrects the reading of the indicator under all conditions.

A general statement of operation will be given, later detailed in an illustrative example. The vertical dimension of storage tank 10 will increase or decrease in response to the effect of external and internal temperatures which may easily vary for every fractional lineal measurement from base to roof. The resulting lineal change, however, will raise, or lower, the bracket 54 a corresponding amount. This effect will be transmitted to the height of the indicator 62 above the ground, automatically maintaining the effective length of operating cable means 34 at the accurate length. Additionally, further adjustment will be made by the thermal response of correcting cable 58 adjusting the vertical movement of the indicator to compensate for the thermal effect on means 34. The result is, evidently, a correct reading of float 24 position and the liquid level, under all conditions no matter how different or varied.

An example, to be comprehensive, should consider two conditions, one in which both the cables and the tank wall either increase or decrease in length, together; and the second where, due to the effects of different temperature conditions, the cables and the tank wall work in opposition. Under the first condition, it will be evident that seldom, if ever, will the same temperature affect both tank and cables. And even if it did, the thermal-response characteristics of the materials of construction would undoubtedly be different insuring that they would never expand or contract equal amounts. As a reasonble assumption, the tank wall will be said to have gained or lost 1" in height over an established datum. Under the statement of this part of the problem requiring both cables and tank to expand or contract together, it is further assumed that the cables extend their length by 5/8" over the same original starting elevation.

When the tank wall expands 1" it lifts the pivoted indicator 62 by means of the corrected cable 58 thereby maintaining the position of that sub-combination in proper relation with the operating cable means. The effective length of cable means 34 on reel 64 is shortened 1", compensating for the wall expansion. However, cable means 34 has lengthened 5/8" also under the effect of increased temperature. As provided, correction cable 58 responds exactly like cable means 34 dropping the frame 60 a like amount. Both the error introduced by the tank wall expansion and the error of the expanding cables are thus corrected. The reverse thermal effect where the tank wall decreases in height and the effect of cable 58 shrinking at the same time will be self-evident. The indicator is dropped compensating for wall contraction, and also lifted correcting the cable shrinkage.

The second phase of the example where the cables and the tank are affected by different resulting temperature conditions will be considered. For clarity such a condition could exist where the contents of the tank are of a temperature widely different from that affecting the cables. Hot oil pumped to storage in freezing weather will establish such a condition. In this instance, the average temperature effect on the tank wall will expand the metal, increasing the height and lifting the pivoted frame of the indicator by means of cable 58. Thus the indicating length of the cable means 34 is maintained at correct and accurate dimension. Additionally, under the terms of the problem, both cables 34 and 58 are contracted by the external temperature effect, thus lifting the pivoted frame an additional amount and correcting the cable length change. The net movement of the indicator is, relative to the ground, cumulative of both temperature effects, but relative to the datum established for correct and normal measurement there is no change and the reading of liquid level on the indicator is correct and accurate.

From the immediately preceding example, it will be evident that a datum to establish the normal relationship between indicator means and float means should be established. It will be understood that the length of cable 58 extending from bracket 54 to pivoted frame 60 once established under conditions approaching as near normal as possible or physically corrected to approach that norm, will be satisfactory. When so established the indicator, for example, can be set at zero when the storage tank 10 contains only a basic level of liquid. From this point all measurements will be established and controlled.

The effect of temperature change being compensated as described above, it remains to describe the operation of the indicator and float combination as affected thereby. As shown in Figure 2, the indicator means includes the indicator wheels with scales on the periphery, a reductor between the wheels proportioning relative movement, a transversely movable reel and engaging bar, a helically grooved sleeve cooperating with the reel, and weight means for balancing and operating power. By the combination of these elements, scales of magnification, and a sensitive, accurately controlled operating mechanism, are provided.

Figure 2 shows the depth indicating scales to be mounted on the rims of two wheels. The larger wheel 70 is peripherally divided into 48 equal divisions representing 48 feet of height possible in the attended storage tank. The circumference of the smaller wheel 74 is divided into three complete one foot scales, sub-divided into inches and fractions of an inch. By such arrangement, the small wheel makes one complete revolution for each measured three feet moved by the larger wheel. Thus in sixteen rotations of the small wheel, the larger wheel will have completed one revolution. Such relationship is chosen because it fits equipment readily available and makes the rotating parts manageable. Further, the rim-mounted scales on the wheels are clearly readable without being unwieldy. This mechanism is rotated in response to movement of the reel which in turn follows the vertical movement of float 24.

When the float is close to the bottom of tank 10, the greater part of operating cable means 34 is suspended between the reel and the float. The indicator looks as shown in Figure 2, with a few loops of cable and attached engaging members wrapped on the reel. As shown on the depth indicating scales, the depth measured is 6 feet, no inches. Further, the reel has been moved, transversely, to the left almost into contact with the indicating wheels. Also, operating cables 92 and 94 have moved the helically grooved sleeve 84 to the left, aligning reel 64 with cable 34. Further fall of float 24 will unwind the remaining turns of cable 34 from reel 64 and move it further to the left, while turning the indicating wheels 70 and 74 closer to a reading of zero.

With the admission of liquid into the tank, float 24 is lifted by the liquid level. The float weight is counterbalanced and weights 96 and 98 are free to start reel 64 to winding cable 34 thereon. Weight 96, in addition to assisting weight 98 in the winding and reel-aligning operation, counterbalances the effect of weight 98 and the downward pull of cable 94. Weight 61, as noted previously, balances the operating parts of the indicating mechanism. To some degree the float and cable weight in tank 10 assists in this upward pull in the vicinity of the reel 64. As released, cable 34 is wound on reel 64, the reel moving to the right as caused by the effect of weights 96 and 98 pulling on helically grooved sleeve 84 by means of engaging cables 92 and 94. The spacing of the engaging members 100, shown here as beads, is such as to permit constant winding without snarling.

In the device built for experiment, the spacing of the beads 100 is set at 27 inches on the cable and a 36 inch circumference reel is used. By spacing the unnotched retaining members 108 at quadrant or 9" arc points, the engaging members are received and held in staggered position on the reel circumferentially and transversely spaced preventing snarling of the line, preserving accuracy, and conserving space. It is evident that the use of notched line guides and unnotched engaging member retainers gives steadiness of operation and accurate response without undue weight or danger of rigidity. This is the advantage of the cable with spaced beads used in conjunction with the especially designed reel, over chain and gear combinations previously used for such purposes.

The above description of the device and its operation in one practical form is believed to disclose an accurate, temperature compensated mechanism affording a vast improvement over earlier, like-operated mechanisms.

I claim:

1. Apparatus for measuring the level of fluent material in a tank comprising a float, indicating means mounted at reading height adjacent the base of said tank responsive to the movement of said float, flexible cable means extending downwardly from the top of the tank operably connecting the float with said indicating means, a pivoted platform supporting the indicating means, and a thermally responsive member connected to the top of said tank and supporting said pivoted platform substantially parallel to the ground, said thermally responsive member being a length equal to the vertical run of said connecting cable means for adjusting the indicating means in response to temperature changes affecting the tank and said connecting cable means.

2. The apparatus of claim 1 further characterized by said indicating means including relatively rotatable drums having indicia mounted on the circumference of each, one graduated in units of measurement and the other in fractions thereof, connected by a reductor means to control the rate of relative rotation.

3. The apparatus of claim 1 further characterized in that said connecting means between the float and indicating means also includes a reel which is shaft connected to the indicating means, said reel being adapted to wind the flexible cable means thereon, said cable means being provided with engaging members fixed thereon and spaced to engage the reel in non-slipping operation.

4. The combination with a liquid-containing tank and a float therein, of a rotatable indicator located externally of said tank, a flexible cable with spaced-apart engaging elements mounted thereon connecting the internal float and external indicator, a reel which is shaft-connected to the indicator, longitudinally extending members circumferentially spaced about said reel engaging the spaced elements on the flexible cable, a pivoted frame supporting the indicator and reel, means fixed relative to the base of the tank operably positioning the pivoted frame, and temperature responsive means paralleling the vertical portion of the flexible cable outside the tank adjusting the position of the indicator in response to thermal changes.

5. The combination with a liquid-storage tank of the fixed roof type and a float therein for indicating elevations of liquid level, of a rotatable indicator positioned externally of said tank, a flexible cable connecting the float with the indicator, a pivotally mounted frame supported by means fixed relative to the base of the tank operably positioning the indicator to engage the flexible cable, liquid seal means conducting the flexible cable across the roof of the tank to connect with the indicator, and a temperature responsive cable connecting the top of the tank with the pivotally mounted frame supporting the indicator, said last-mentioned cable being in parallel alignment with the float cable and operating to adjust the indicator position in response to temperature effects on the float cable and on the storage tank.

6. The combination of claim 5 further characterized by spaced-apart engaging elements mounted on the flexible cable connecting the float and indicator, a reel adapted to receive the engaging elements on said cable, a shaft operably connecting the indicator and slidably supporting said reel, a helical drive sleeve on the shaft and connected to the reel, and weight means cable-connected to said helical drive sleeve to support and rotate the reel and connected indicator in response to the movement of the float and to slidably position said reel to maintain the float-connected cable in a vertical position relative to the reel.

References Cited in the file of this patent

UNITED STATES PATENTS

| 1,221,975 | Cuff | Apr. 10, 1917 |
| 1,240,954 | Delmas | Sept. 25, 1917 |
| 1,629,758 | Wilson | May 24, 1927 |
| 1,689,941 | Brooks | Oct. 30, 1928 |
| 2,144,113 | Jurs | Jan. 17, 1939 |
| 2,193,423 | Jett | Mar. 12, 1940 |
| 2,216,036 | Lang | Sept. 24, 1940 |
| 2,596,305 | Stevens | May 13, 1952 |
| 2,629,261 | McKinney | Feb. 24, 1953 |
| 2,685,742 | Johnson | Aug. 10, 1954 |

FOREIGN PATENTS

| 621,778 | France | May 6, 1928 |